United States Patent
Sugumar et al.

(10) Patent No.: US 7,191,316 B2
(45) Date of Patent: Mar. 13, 2007

(54) METHOD AND A SYSTEM FOR USING SAME SET OF REGISTERS TO HANDLE BOTH SINGLE AND DOUBLE PRECISION FLOATING POINT INSTRUCTIONS IN AN INSTRUCTION STREAM

(75) Inventors: Rabin A. Sugumar, Sunnyvale, CA (US); Sorin Iacobovici, San Jose, CA (US); Robert Nuckolls, Sunnyvale, CA (US); Chandra M. R. Thimmannagari, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 582 days.

(21) Appl. No.: 10/353,662

(22) Filed: Jan. 29, 2003

(65) Prior Publication Data

US 2004/0148492 A1    Jul. 29, 2004

(51) Int. Cl.
*G06F 9/30*    (2006.01)
*G06F 9/40*    (2006.01)
*G06F 15/00*    (2006.01)

(52) U.S. Cl. .................................. 712/222; 712/221
(58) Field of Classification Search ............... 712/222, 712/221
See application file for complete search history.

(56) References Cited

U.S. PATENT DOCUMENTS 6,405,305 B1 * 6/2002 Meier et al. ................ 712/222

* cited by examiner

*Primary Examiner*—Fritz Fleming
*Assistant Examiner*—Jesse Moll
(74) *Attorney, Agent, or Firm*—Osha-Liang LLP

(57) ABSTRACT

A system for handling a plurality of single precision floating point instructions and a plurality of double precision floating point instructions that both index a same set of registers is provided. The system comprises a decode unit arranged to decode, stall, and forward at least one of the plurality of single precision and at least one of the plurality of double precision floating point instructions in a fetch group. The decode unit includes a first counter arranged to increment for each of the plurality of single precision floating point instructions forwarded down a pipeline; a second counter arranged to increment for each of the plurality of double precision floating point instructions forwarded down the pipeline; a first mask register and a second mask register. The first mask register is updated by each of the single precision floating point instructions forwarded and the second mask register is updated by each of the double precision floating point instructions forwarded.

22 Claims, 10 Drawing Sheets

METHOD AND A SYSTEM FOR USING SAME SET OF REGISTERS TO HANDLE BOTH SINGLE AND DOUBLE PRECISION FLOATING POINT INSTRUCTIONS IN AN INSTRUCTION STREAM

BACKGROUND OF INVENTION

A typical computer system includes at least a microprocessor and some form of memory. The microprocessor has, among other components, arithmetic, logic, and control circuitry that interpret and execute instructions necessary for the operation and use of the computer system. FIG. 1 shows a typical computer system (10) having a microprocessor (12), memory (14), integrated circuits (IC) (16) that have various functionalities, and communication paths (18, 20), i.e., buses and wires, that are necessary for the transfer of data among the aforementioned components of the computer system (10).

An instruction executed by the typical computer system shown in FIG. 1, at the lowest level, is a series of ones and zeroes that describe physical operations. Assembly code is an abstraction of the series of ones and zeroes representing physical operations within the computer that allow humans to write instructions for the computer. Examples of instructions written in assembly code include ADD, SUB, MUL, DIV, BR, etc. The examples of instructions previously mentioned are typically combined as an assembly program (or generally, a program) to accomplish sophisticated computer operations.

Depending on the type of instruction being executed, storage areas or registers are specified that contain data or an address to a location that contains data used in executing the instruction. Additional registers are used to facilitate the execution of instructions in a program, e.g., instruction registers, program counters, pipe stages registers (i.e., intermediary registers along the pipeline).

The facilitation of floating point registers is particularly important to the proper execution of floating point instructions. First, a floating point number is a number that is carried out to a certain number of decimal positions. For example, the number pi is 3.14159265 when carried out to the eighth decimal place. Decimal numbers may be represented in binary form as a floating point number. Floating point numbers are stored in three parts: the sign (plus or minus), the significant (or mantissa), and the exponent (or order of magnitude of the significant). The exponent determines the decimal place to which the decimal point "floats."

Floating point numbers may be single or double precision. Typically, a single precision floating point number requires thirty-two bits to be represented. The first bit is the sign, the next eight bits form the exponent, and the remaining twenty-three bits form the significant. A double precision floating point number typically requires sixty-four bits to be represented. The first bit is the sign, the next eleven bits form the exponent; and the remaining fifty-two bits form the significant.

In a typical microprocessor as shown in FIG. 2, a single register (typically thirty-two bits wide) stores single precision floating point numbers and two registers are required to store double precision floating point numbers. The two registers used to store double precision floating point numbers are typically successive registers, e.g., if a double precision floating point number was specified as being stored in Register 2, the double precision floating point number most likely would reside in Register 2 and Register 3.

Floating point instructions may manipulate (e.g., move, convert, or perform arithmetic, trigonometric, logarithmic, or exponential operations) both single precision and double precision floating point numbers. Floating point instructions that operate on floating point numbers typically include two source registers in which the source operands are stored and a destination register in which the result of the operation is written. Floating point operations operate specifically on single or double precision floating point numbers and are considered single precision floating point operations or double precisions floating point operations, respectively. Because double precision floating point numbers require two registers for each source operand, floating point operations may execute improperly if source registers are not read from appropriate sources, e.g., floating point working register file (FWRF), floating point architectural register file (FARF), data cache unit (DCU), or bypass. For example, Code Sample 1 below shows three floating point operations.

Code Sample 1: Floating Point Operations 1 fpop1 R10, R12, R8
2 fpop2 R1, R3, R5
3 fpop3 R4, R8, R10

In line 1 of Code Sample 1, a double precision floating point operation, fpop1, reads the first source operand and the second source operand. The result is written in destination register.

FIGS. 2–4 show block diagrams of a set of registers and which source and destination registers are accessed under both single and double precision floating point operations. In FIG. 2, the reading of two source registers (30, 32) is shown by a dotted oval and the writing to a destination register (34) is shown by a dotted rectangle.

In FIG. 3, the reading of two source registers (36, 38) is shown by a dotted oval, and the writing to destination register (40) is shown by a dotted rectangle. The result of the operation in line 1 of Code Sample 1 is indicated in FIG. 3 by shading the destination Registers 8 and 9.

In line 3 of Code Sample 1, a double precision floating point operation, fpop3, reads the first source operand which is stored in source registers. The second source operand, which is stored in a source register, is read. The result is written in destination registers. In FIG. 4, the reading of the two source registers (42, 44) is shown by a dotted oval and the writing to destination register (46) is shown by a dotted rectangle. The results of the operations from both line 1 and 2 of Code Sample 1 are indicated in FIG. 4 by shading the Registers 5, 8, and 9. There is potential conflict in accessing Register 5.

Typically, in handling floating point operations, a rename unit and issue unit work together to ensure that the appropriate data is forwarded (i.e., from FWRF, FARF, cache, by-pass, or the like) to the single precision and double precision floating point instructions when issued thereby avoiding potential conflict. The additional logic necessitated by a rename unit and issue unit for handling single precision and double precision floating point instructions often results in complicated logic, substantially increasing the power and design time.

SUMMARY OF INVENTION

In general, one aspect of the invention involves a system for handling a plurality of single precision floating point instructions and double precision floating point instructions. The system comprises a decode unit arranged to decode, stall, and forward at least one of the plurality of single precision and at least one of the plurality of double precision floating point instructions in a fetch group.

The decode unit comprises a first counter arranged to increment for at least one of the plurality of single precision floating point instructions forwarded; a second counter arranged to increment for at least one of the plurality of double precision floating point instructions forwarded; a first mask register indexed by double precision registers, wherein the first mask register is updated by at least one of the plurality single precision floating point instructions forwarded; and a second mask register indexed by single precision registers, wherein the second mask register is updated by at least one of the plurality double precision floating point instructions forwarded.

In general, one aspect of the invention involves a method for handling a plurality of single precision floating point instructions and a plurality of double precision floating point instructions in an instruction stream (i.e., fetch groups forwarded by the fetch unit). The method comprises decoding at least one of the plurality of single precision floating point instructions and at least one of the plurality of the double precision floating point instructions and evaluating the at least one of the plurality of the single precision floating point instructions and at least one of the plurality of the double precision floating point instructions, and based on the evaluating, processing the at least one of the plurality of the single precision floating point instructions and at least one of the plurality of the double precision floating point instructions. The evaluating is based on values of a first counter and a second counter and based on indexing of a first mask register and a second mask register.

In general, one aspect of the invention involves a method for handling a plurality of single precision floating point instructions and a plurality of double precision floating point instructions in an instruction stream. The method comprises step for decoding at least one of the plurality of the single precision floating point instructions and at least one of the plurality of the double precision floating point instructions, step for evaluating the at least one of the single precision floating point instructions and the at least one of the plurality of the double precision floating point instructions, and based on the step for evaluating, step for processing the at least one of the plurality of the single precision floating point instructions and at least one of the plurality of the double precision floating point instructions. The step for evaluating is based on values of a first counter and a second counter and based on indexing of a first mask register and a second mask register.

In general, one aspect of the invention relates to a system for handling a plurality of single precision floating point instructions and a plurality of double precision floating point instructions. The system comprises means for decoding, stalling and forwarding, at least one of the plurality of the single precision floating point instructions and at least one of the plurality of the double precision floating point instructions.

The means for decoding, stalling and forwarding comprises a first means for counting at least one of the plurality of single precision floating point instructions forwarded; a second means for counting at least one of the plurality of double precision floating point instructions forwarded; a first means for indexing a first mask register, wherein the first mask register is updated by at least one of the plurality of single precision floating point instructions forwarded down the pipeline; and a second means for indexing a second mask register, wherein the second mask register is updated by at least one of the plurality of double precision floating point instructions forwarded down the pipeline.

Other aspects and advantages of the invention will be apparent from the following description and the appended claims.

DETAILED DESCRIPTION

Figure 1:
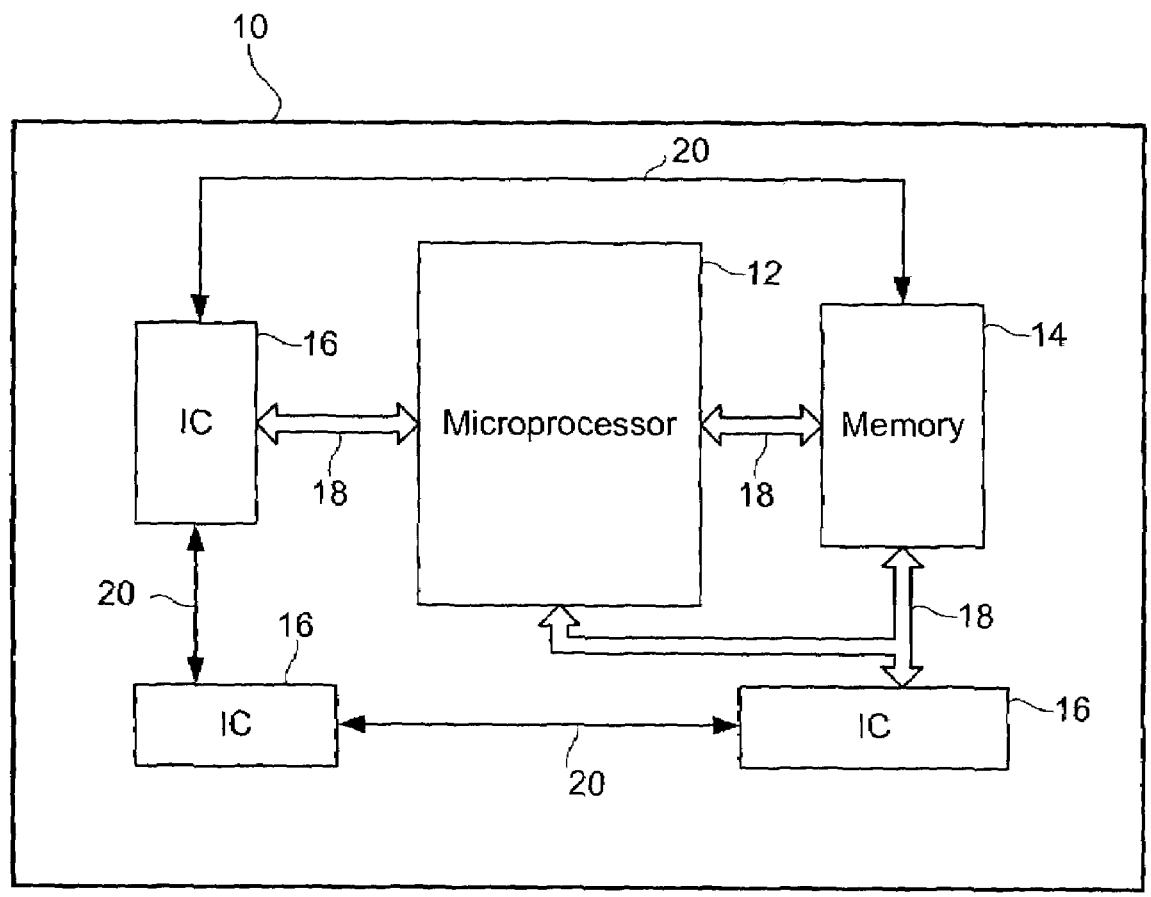
FIG. 1 shows a block diagram of a typical computer system.
Figure 2:
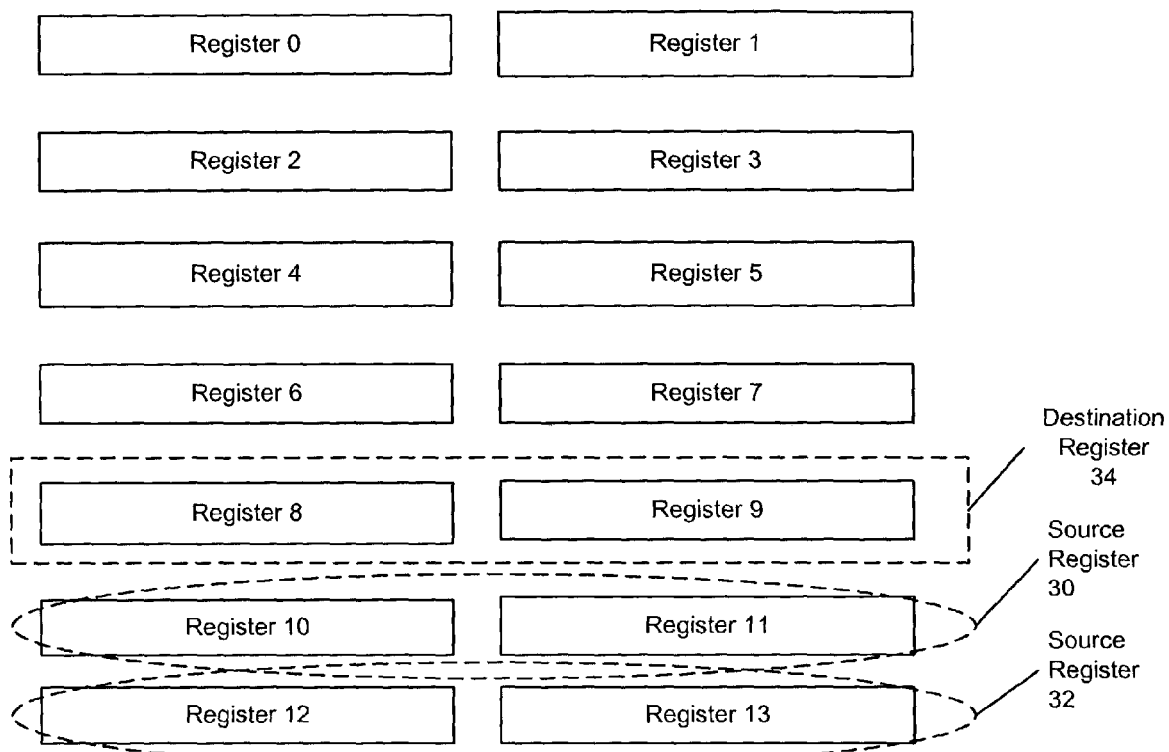
FIGS. 2–4 show a block diagram of a set of registers under both single and double precision floating point operations.
Figure 3:
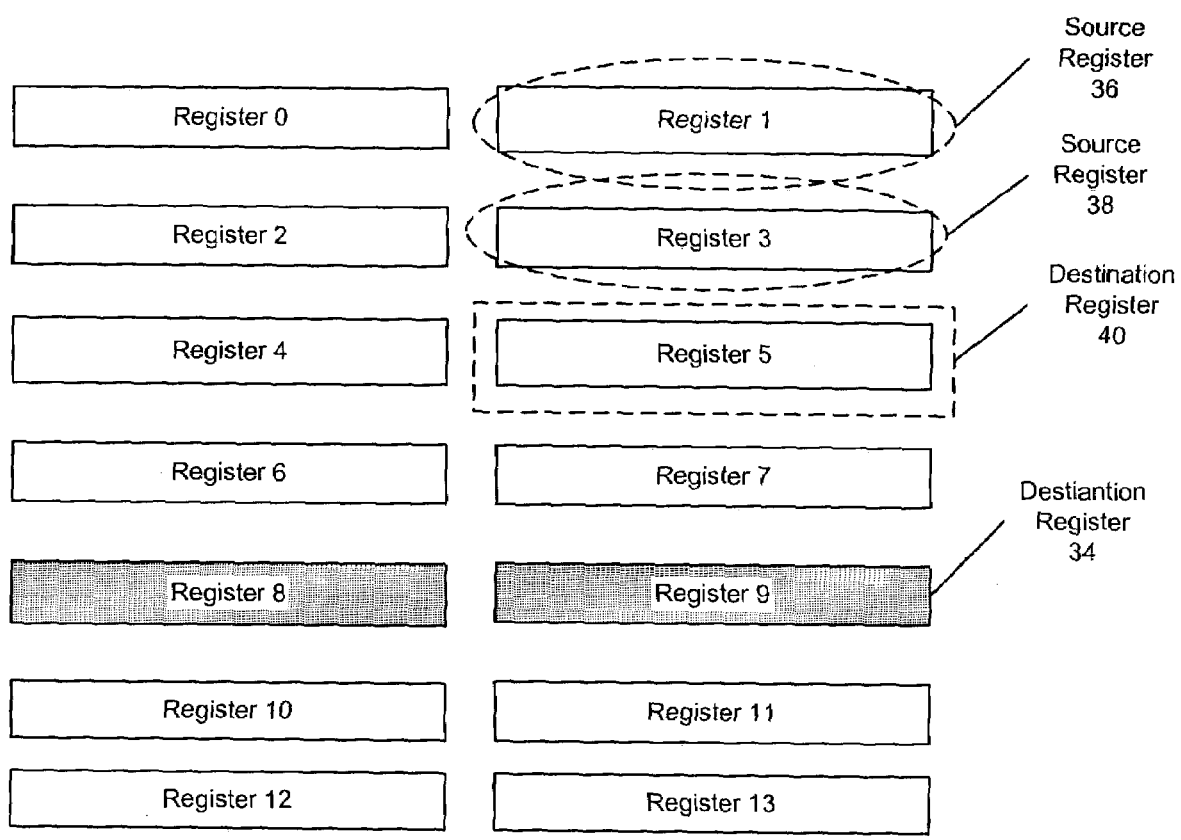
Figure 4:
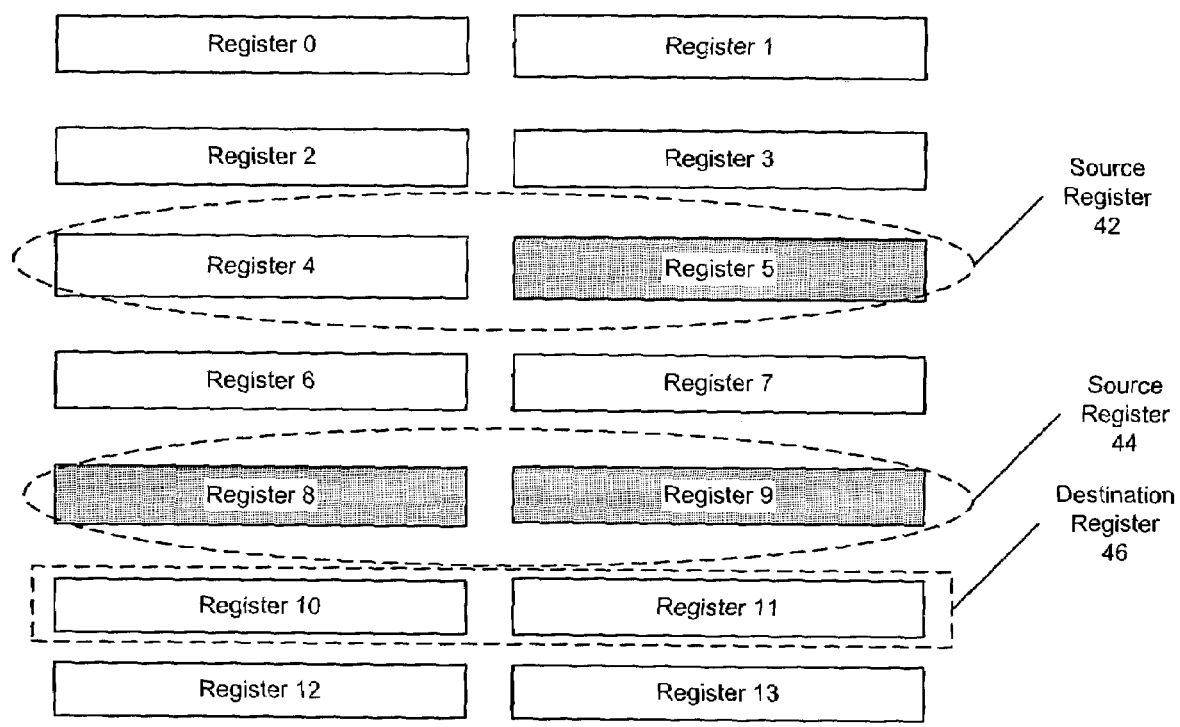

Exemplary embodiments of the invention will now be described in detail with references to the accompanying figures. Like elements in various figures are denoted by like reference numerals throughout the figures for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 5:
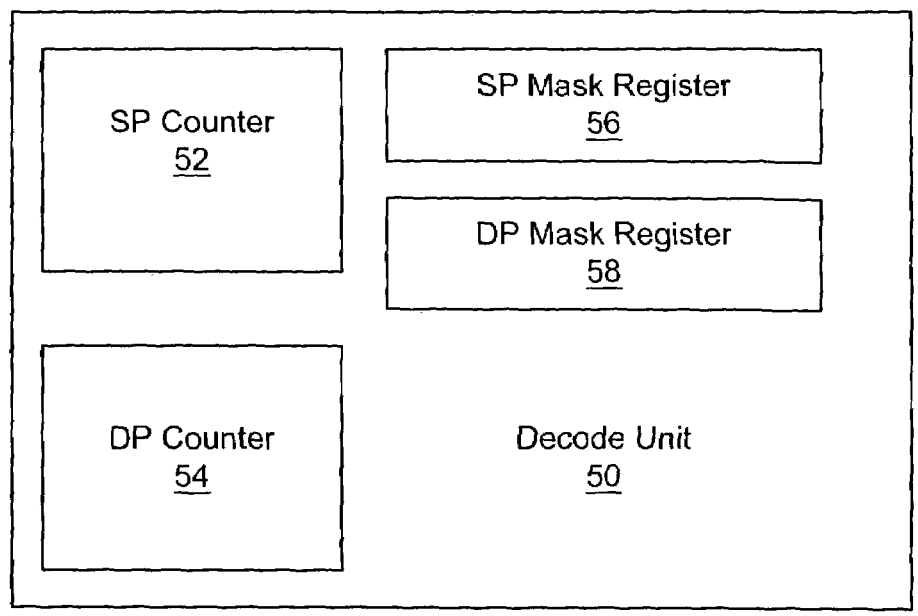
FIG. 5 shows a block diagram of a decode unit in accordance with an embodiment of the invention.

Embodiments of the invention relate to a method for handling a mix of single precision and double precision floating point instructions in a program or instruction stream. FIG. 5 shows an exemplary decode unit in accordance with an embodiment of the invention. Decode units are used to identify instructions in a fetch group and forward each instruction accordingly. In FIG. 5, decode unit (50) includes a single precision counter (SP counter) (52), a double precision counter (DP counter) (54), a single precision (SP) mask register (56), and a double precision (DP) mask register (58). The decode unit (50), including the SP counter (52), the DP counter (54), the SP mask register (56), and the DP mask register (58), is used to stall or forward floating point instructions to ensure correct behavior.

The SP counter (52) is incremented whenever a valid single precision modifying floating point instruction is forwarded by the decode unit (50) down the pipe and decremented whenever a valid single precision, modifying instruction is committed. Similarly, the DP counter (54) is incremented whenever a valid double precision, modifying floating point instruction is forwarded by the decode unit down the pipe and decremented whenever a valid double precision, modifying instruction is committed.

Figure 6:
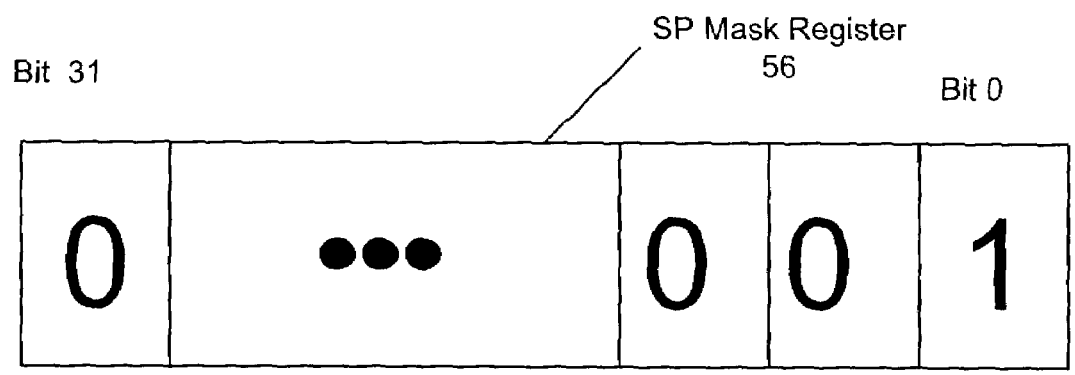
FIG. 6 shows a block diagram of single precision and double precision mask registers in accordance with an embodiment of the invention.
Figure 6:
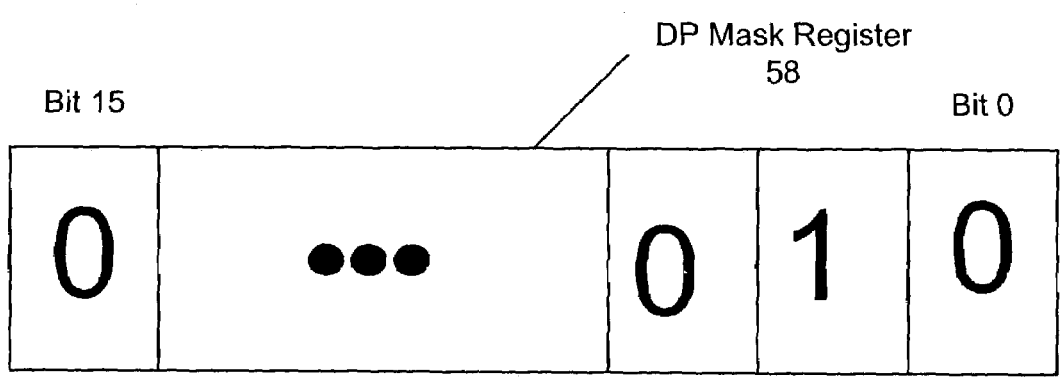

In addition to the SP counter (52) and the DP counter (54), the decode unit (50) also maintains the SP mask register (56) and the DP mask register (58). FIG. 6 shows a single precision and double precision mask register in accordance with an embodiment of the invention. The SP mask register (56) and DP mask register (58) have bits (or fields) that are indexed to be updated by destination registers of single precision or double precision floating point instructions. The SP mask register (56) and DP mask register (58) have bits (or fields) that are indexed to be used by the source registers of the single precision or double precision floating point instructions. The SP mask register (56) is a thirty-two bit mask. A logic one in bit-zero indicates that Register 0 is to be updated by a single precision floating point instruction. Similarly, the DP mask register (58) is a sixteen bit mask corresponding to sixteen double precision registers. For example, a logic one in bit-one corresponds to Register 2 (and Register 3) that are to be updated by a double precision floating point instruction.

Figure 7:
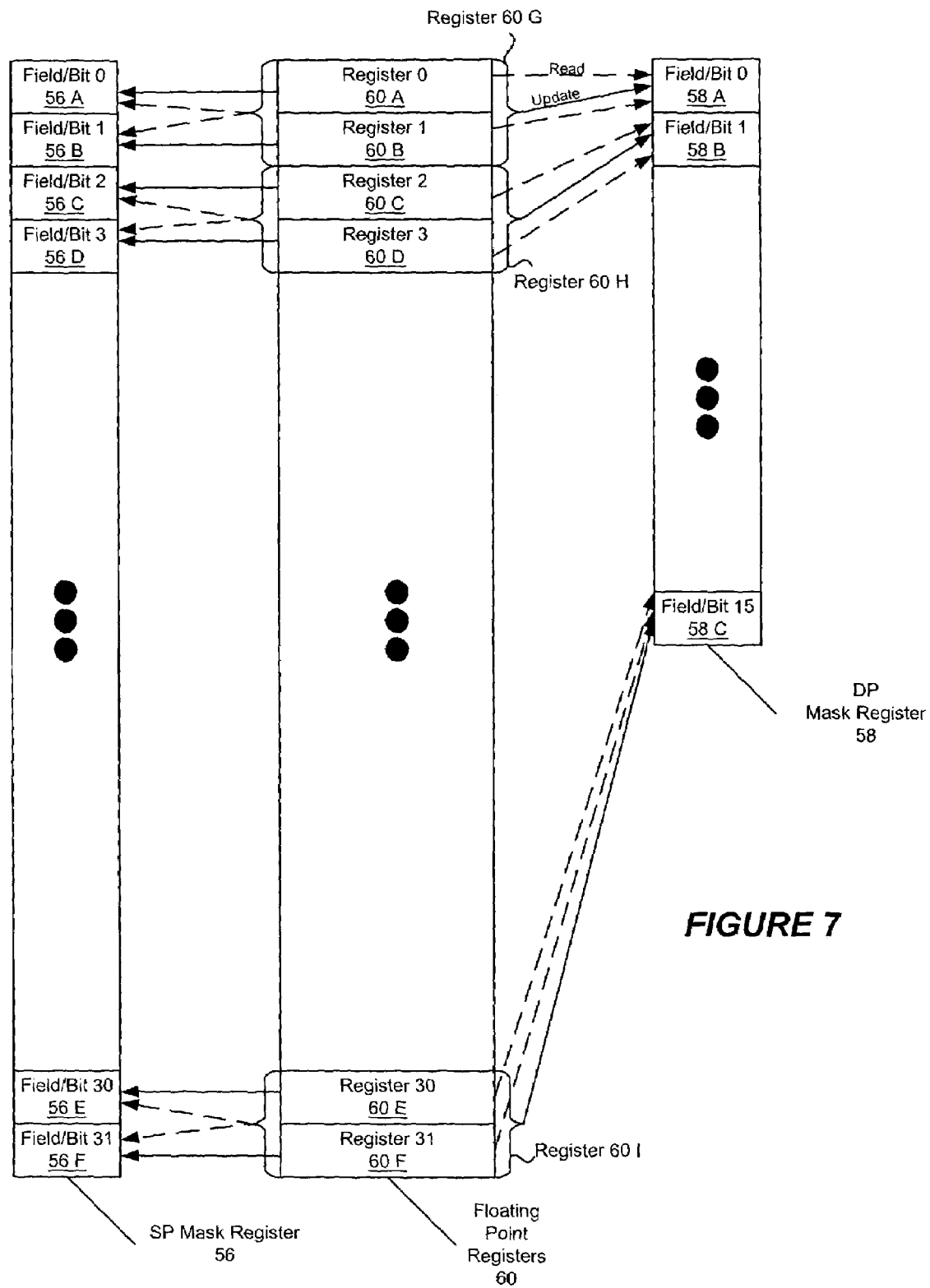
FIG. 7 shows a block diagram of a single precision and double precision mask register being indexed to update and read by a set of floating point registers in accordance with an embodiment of the invention.

FIG. 7 shows a single precision and a double precision mask register being indexed by a set of floating point registers in accordance with an embodiment of the invention. In FIG. 7, a set of sixteen or thirty-two registers (60) index the SP mask register (56) and DP mask register (58) in some cases to update and in some cases to read contents of the registers. There is a one to one correspondence between the thirty-two single precision registers (60) and the bits of the SP mask register (56) and a one to two correspondence between the sixteen double precision registers (60) and the bits of the SP mask register (56). There is a one to one correspondence between the sixteen double precision registers (60) and the bits of the DP mask register (58) and a two to one correspondence between the thirty-two single precision registers (60) and the bits of the DP mask register (58).

For example, bit-zero (56 A), bit-one (56 B), bit-two (56 C), bit-three (56 D), bit-thirty (56 E), and bit-thirty-one (56 F) of the SP mask register (56) correspond to SP Register 0 (60 A), SP Register 1 (60 B), SP Register 2 (60 C), Register 3 (60 D), SP Register 30 (60 E), and SP Register 31 (60 F), respectively.

Bit-zero (56 A) & bit-one (56 B), bit-two (56 C) & bit-three (56 D), and bit-thirty (56 E) & bit-thirty-one (56 F) of the SP mask register (56) correspond to the DP Register 0 (60 G), DP Register 2 (60 H), and DP Register 30 (60 I), respectively.

Furthermore, bit-zero (58 A) of the DP mask register (58) corresponds to SP Register 0 (60 A) and SP Register 1 (60 B); and bit-one (58 B) of the DP mask register (58) corresponds to SP Register 2 (60 C) and SP Register 3 (60 D); and bit-fifteen (58 C) corresponds to SP Register 30 (60 D) and SP Register 31 (60 E). Bit-zero (58 A) of DP mask register (58) corresponds to DP Register 0 (60 G); bit-one (58 B) of DP mask register (58) corresponds to DP Register 2 (60 H); bit-fifteen (58 C) corresponds to DP Register 30 (60 I).

Figure 8:
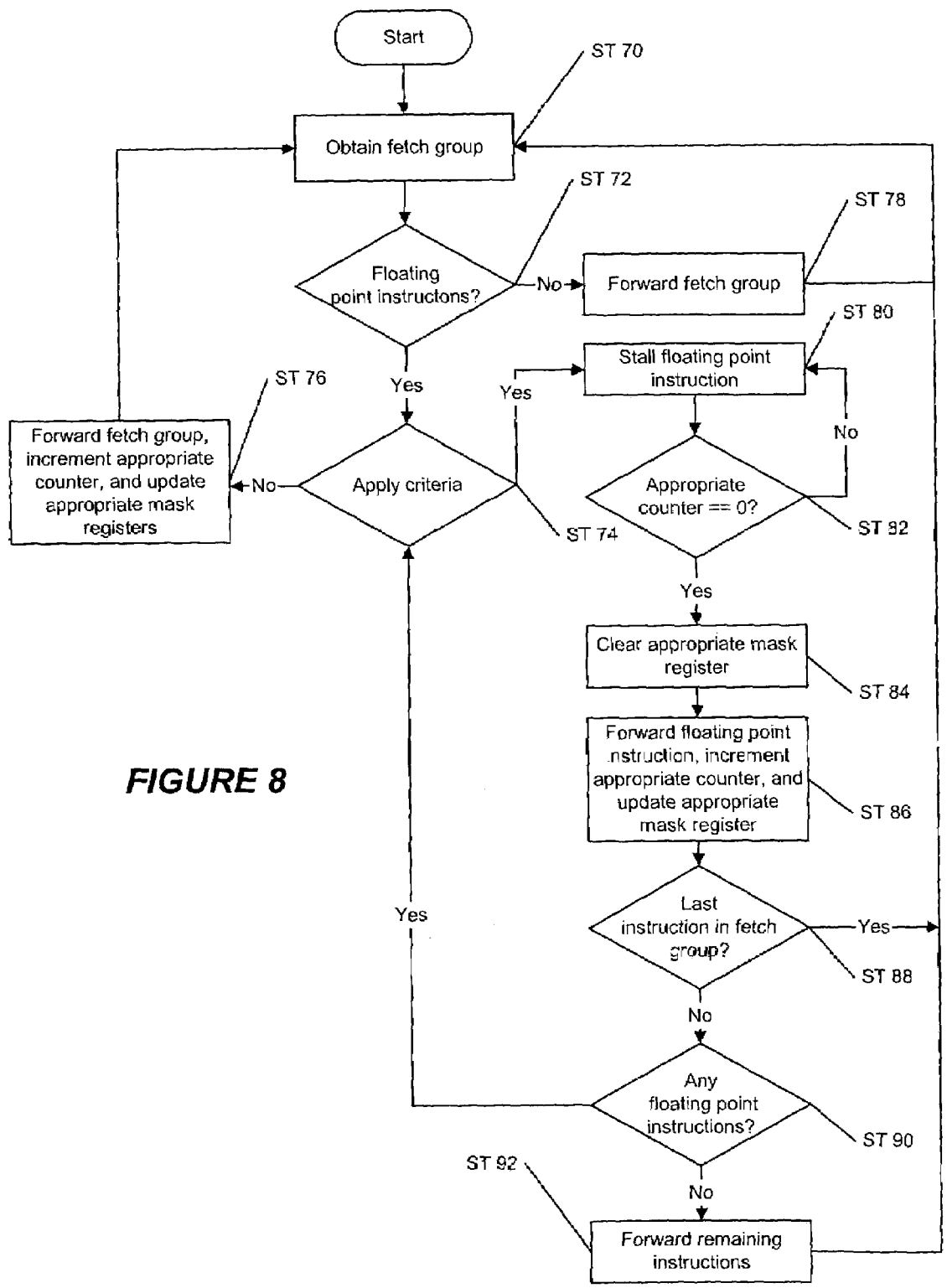
FIG. 8 shows a flow diagram of handling single precision and double precision floating point instructions in accordance with an embodiment of the invention.

FIG. 8 shows an exemplary flow process for handling single precision and double precision floating point instructions in accordance with an embodiment of the invention. Initially, a fetch group is obtained by a decode unit from a fetch unit (Step 70). The fetch group is decoded for any floating point instructions (Step 72). If there are no floating point instructions, the instructions in the fetch group are forwarded down the pipe (Step 78).

Otherwise, a criteria is applied depending on the floating point instructions (Step 74). The criteria determines whether to stall or forward the floating point instruction in the fetch group. If the criteria does not apply to the floating point instructions, the instructions in the fetch group are forwarded down the pipe, the appropriate counters are incremented, and the appropriate mask registers are updated (Step 76).

On the other hand, if the criteria does apply, the floating point instruction and all younger instructions, i.e., instructions that are after the current floating point instruction in a fetch group, are stalled (Step 80). If an appropriate counter is zero (Step 82), the appropriate mask register is cleared (Step 84). However, if the appropriate counter is non-zero, then the floating point instruction continues to stall (Step 80). For example, if a double precision floating point instruction is stalled, then the stalled double precision floating point instruction is forwarded when a single precision counter is zero. Similarly, if a single precision floating point instruction is stalled, then the stalled single precision floating point instruction is forwarded when the double precision counter is zero.

After the appropriate mask register is cleared (Step 84), the floating point instruction is forwarded, the appropriate counter is incremented, and the appropriate mask register is updated (Step 86). If the floating point instruction forwarded is the last valid instruction in the fetch group, a next fetch group is obtained from the fetch unit (Step 88). Otherwise, a determination is made whether there are any other floating point instructions remain in the fetch group (Step 90). If there are any floating point instructions, apply criteria (Step 74). Otherwise, forward the remaining instructions in the fetch group down the pipe (Step 92) and obtain a fetch group from the fetch unit (Step 70).

In one embodiment, the criteria used to determine whether a floating point instruction is stalled involves examining floating point instructions in view of the SP counter, the DP counter, the SP mask, and DP mask. The floating point instruction is stalled in the four following instances, according to the criteria.

1) In the fetch group, there is a double precision floating point instruction where at least one of double precision floating point instruction's source registers when used to index into the thirty-two bit SP mask register reveals a logic 1 in the source register's corresponding position. For example, the double precision floating point instruction has Register 2 as one of its source registers and indexing into the thirty-two bit SP mask register using the Register 2 field as an index identification reveals logic 1 in position 2, position 3, or position 2 and 3 of the thirty-two bit SP mask register.

2) In the fetch group, there is a single precision floating point instruction where at least one of the single precision floating point instruction's source registers when used to index into the sixteen bit DP mask register reveals a logic 1 in the source register's corresponding position. For example, the single precision instruction has Register 3 as one of its source registers and indexing into the sixteen bit DP mask register reveals a logic 1 in position 1 of the sixteen bit DP mask register.

3) In the fetch group, there is a single precision instruction that is "younger" than a double precision instruction in the same fetch group. The younger single precision floating point instruction references as source operand the destination register of the "older" double precision instruction in the same fetch group. In this case, the decode unit forwards all instructions older to the single precision floating point instruction in the fetch group, but stalls on the single precision floating point instruction and all instructions younger to the single precision floating point instruction in the fetch group.

4) In the fetch group, there is a double precision instruction that is "younger" than a single precision instruction in the same fetch group. The younger double precision floating point instruction references as source operand the destination register of the "older" single precision instruction in the same fetch group. In this case, the decode unit forwards all instructions older to the double precision floating point instruction in the fetch group, but stalls on the double precision floating point instruction and all instructions younger to the double precision floating point instruction in the fetch group.

One skilled in the art will understand that the term "younger" and "older" is used to describe the ordering of an instruction relative to another instruction.

Code Sample 2: "Younger" Floating Point Operations 1 fpop(N)- - -
2 fpop (N+1)- - -

For example, in Code Sample 2, given a fetch group with floating point operations fpop(N) and fpop(N+1), where N is a positive integer, fpop(N+1) is considered the younger floating point instruction.

One skilled in the art will also understand that the criteria may include a variety of factors that satisfy the scenarios 1–4.

For example, the criteria may involve a "counter boolean," a "mask boolean," and a "operand boolean." The operand boolean includes an "ordinal boolean" and a "reference boolean." Table 1 shows exemplary combination of evaluations of the boolean values and a result in accordance with one embodiment of the invention.

TABLE 1

Truth Table for Forwarding and Stalling Floating Point Instructions

| | | Operand | | | Stall or |
|---|---|---|---|---|---|
| | Counter | Reference | Ordinal | Mask | Forward |
| 1 | X | True | True | X | Stall |
| 2 | False | X | X | True | Stall |
| 3 | True | True | False | X | Forward |
| 4 | True | False | X | X | Forward |
| 5 | False | False | X | False | Forward |
| 6 | False | True | False | False | Forward |

Note
"X" is "does not matter."

The counter boolean, in the first column of Table 1, indicates whether both a DP counter and SP counter are zero. According to the counter boolean, the operand boolean and/or mask boolean are evaluated. If the counter boolean is evaluated to be zero ("true"), only the operand boolean is used to determine whether the floating point instruction is forwarded or stalled.

The operand boolean, in the second column of Table 1, is formed by the reference and ordinal booleans. The reference boolean indicates whether a single precision destination register of a floating point instruction is referenced by one or more double precision source registers or a double precision destination register of a floating point instruction is referenced by one or more single precision source registers. The ordinal boolean indicates whether the floating point operation referencing the destination register is a "younger" floating point instruction. Both the reference boolean and the ordinal boolean must be evaluated as "true" to potentially stall a floating point instruction.

Figure 9:
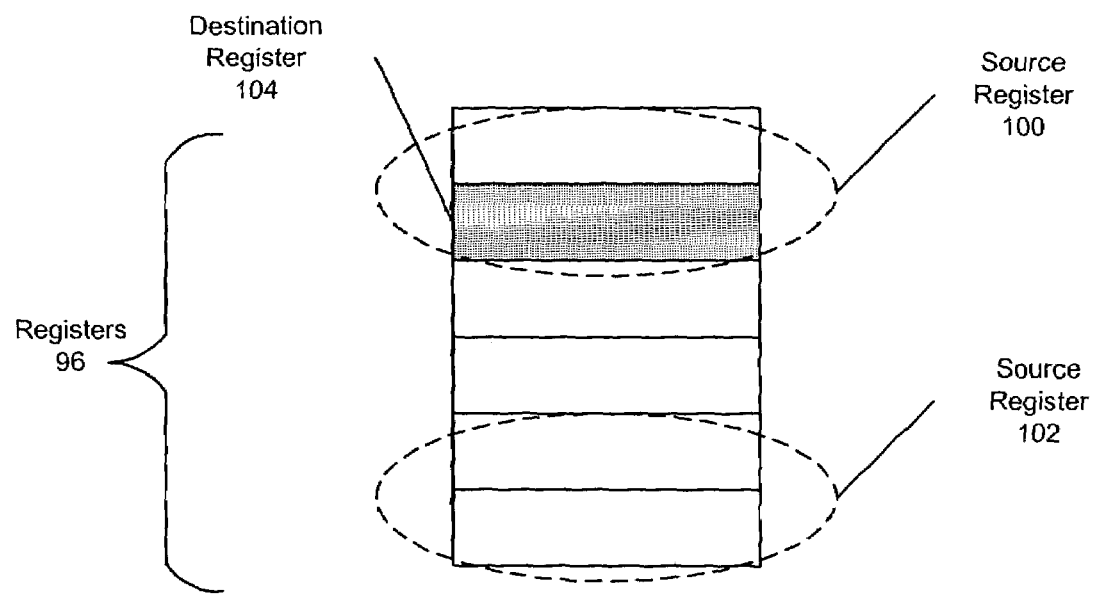
FIGS. 9–11 show a block diagram of a set of registers in which a criteria is applied in accordance with an embodiment of the invention.
Figure 10:
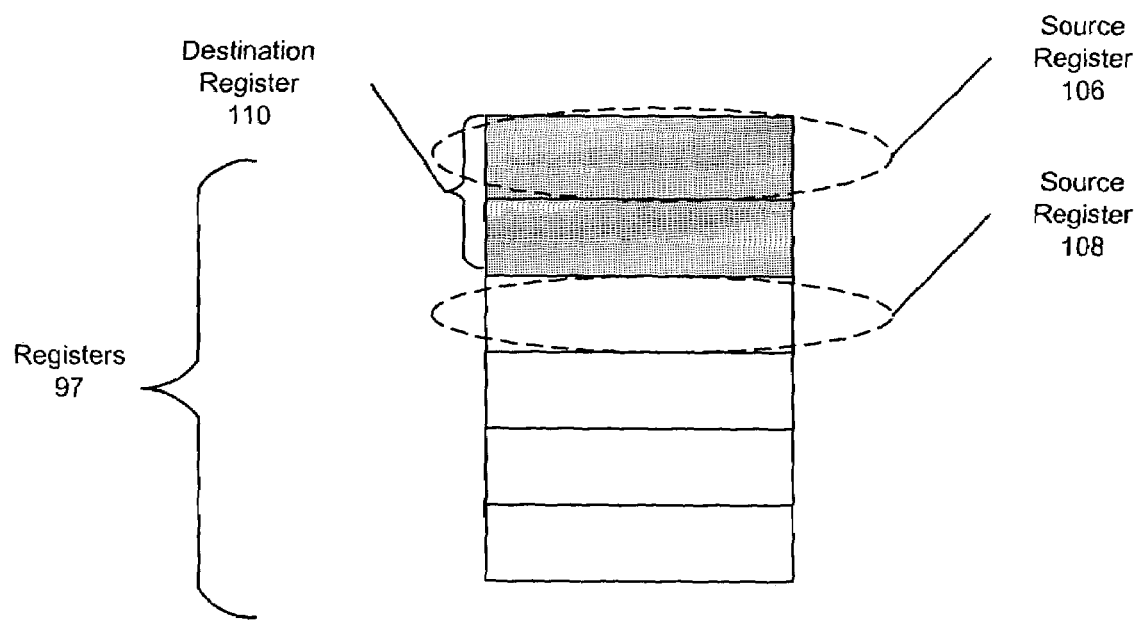

For example, FIGS. 9 and 10 show an exemplary set of registers in which the reference boolean and ordinal boolean is applied in accordance with an embodiment of the invention. In FIG. 9, in a set of registers (96), there are two source registers (100, 102) and a destination register (104). The destination register (104) is the register being written for a floating point operation fpop (N) of Code Sample 2 (indicated by shading). The source registers (100, 102) are the registers being read for the floating point operation fpop (N+1) of Code Sample 2. Because fpop (N+1) is an instruction whose source register (100) references as a source operand the destination register (104), the reference boolean evaluates to "true." Since double precision fpop (N+1) is a younger instruction, the ordinal boolean evaluates to "true."

In another example shown in FIG. 10, in the set of registers (97), there are two source registers (106, 108) and a destination register (110). The destination register (110) is the register being written for a floating point operation fpop (N) of Code Sample 2 (indicated by shading). The source registers (106, 108) being read for a floating point operation fpop (N+1) of Code Sample 2. Because fpop (N+1) is an instruction whose source register (106) references as a source operand the destination register (110), the reference boolean evaluates to "true." Since single precision fpop (N+1) is a younger instruction, the ordinal boolean evaluates to "true."

However, if the counter boolean is evaluated as "false," i.e., the SP counter and/or DP counter is/are non-zero, then the operand boolean and/or the mask boolean determine if the floating point instruction is stalled or forwarded. The mask boolean evaluates to "true," if, and only if, the source register referenced by a floating point instruction when indexed into the appropriate mask register reveals logic 1 at the corresponding position (or positions) (i.e., a single precision source register referenced by floating point instruction when indexed into the DP mask register reveals a logic 1 at the corresponding position or a double precision source register referenced by floating point instruction when indexed into the SP mask register reveals a logic 1 at any one of its two corresponding positions).

Figure 11:
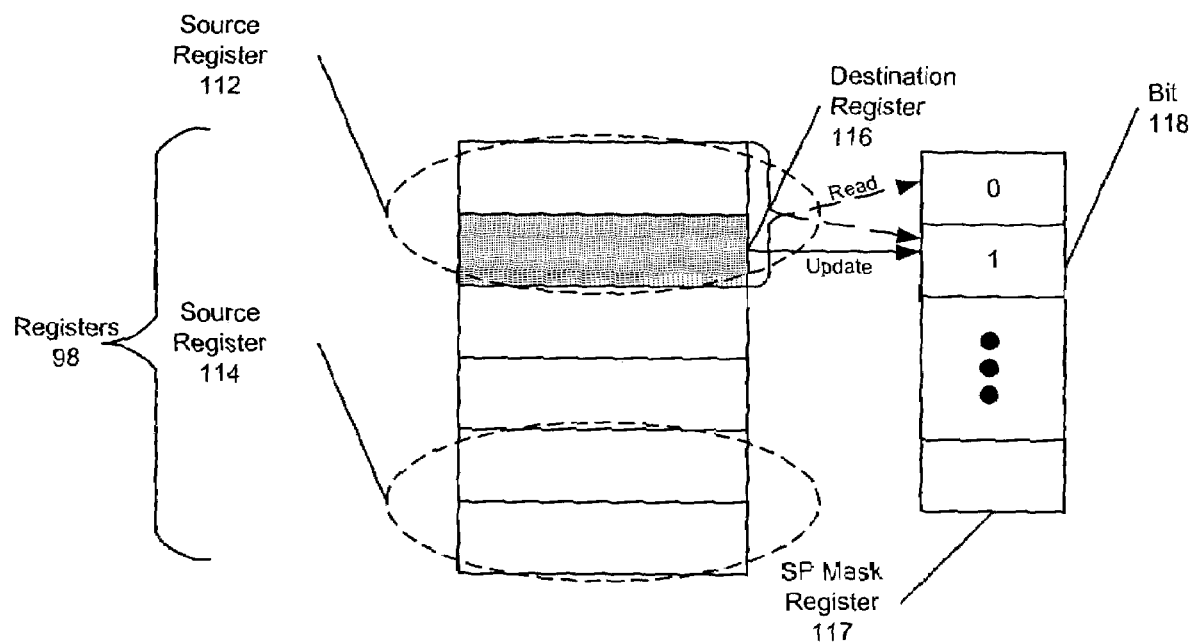

FIG. 11 shows a block diagram of an exemplary set of registers in which the mask boolean is applied in accordance with an embodiment of the invention. In a set of registers (98), there are two source registers (112, 114) and a destination register (116). The destination register (116) is the register being written for a floating point operation fpop (N) of Code Sample 2 (indicated by shading). The source registers (112, 114) are the registers being read of floating point operation fpop (N+1) of Code Sample 2. In this case, indexing into bit-zero and bit-one of the SP mask register (117) by source register (112) reveals a logic 1 in position 1 (i.e., bit (118)), the mask criteria evaluates as "true."

Therefore, as shown in Table 1, a floating point instruction is stalled in two ways according to a criteria. First, if the operand boolean is "true," meaning both the ordinal boolean and the reference boolean are evaluated as "true," the floating point instruction is stalled. Second, if the counter boolean is "false" and mask boolean is "true," the floating point instruction is stalled. All other combinations of the criteria result in the floating point instruction being forwarded.

Figure 12:
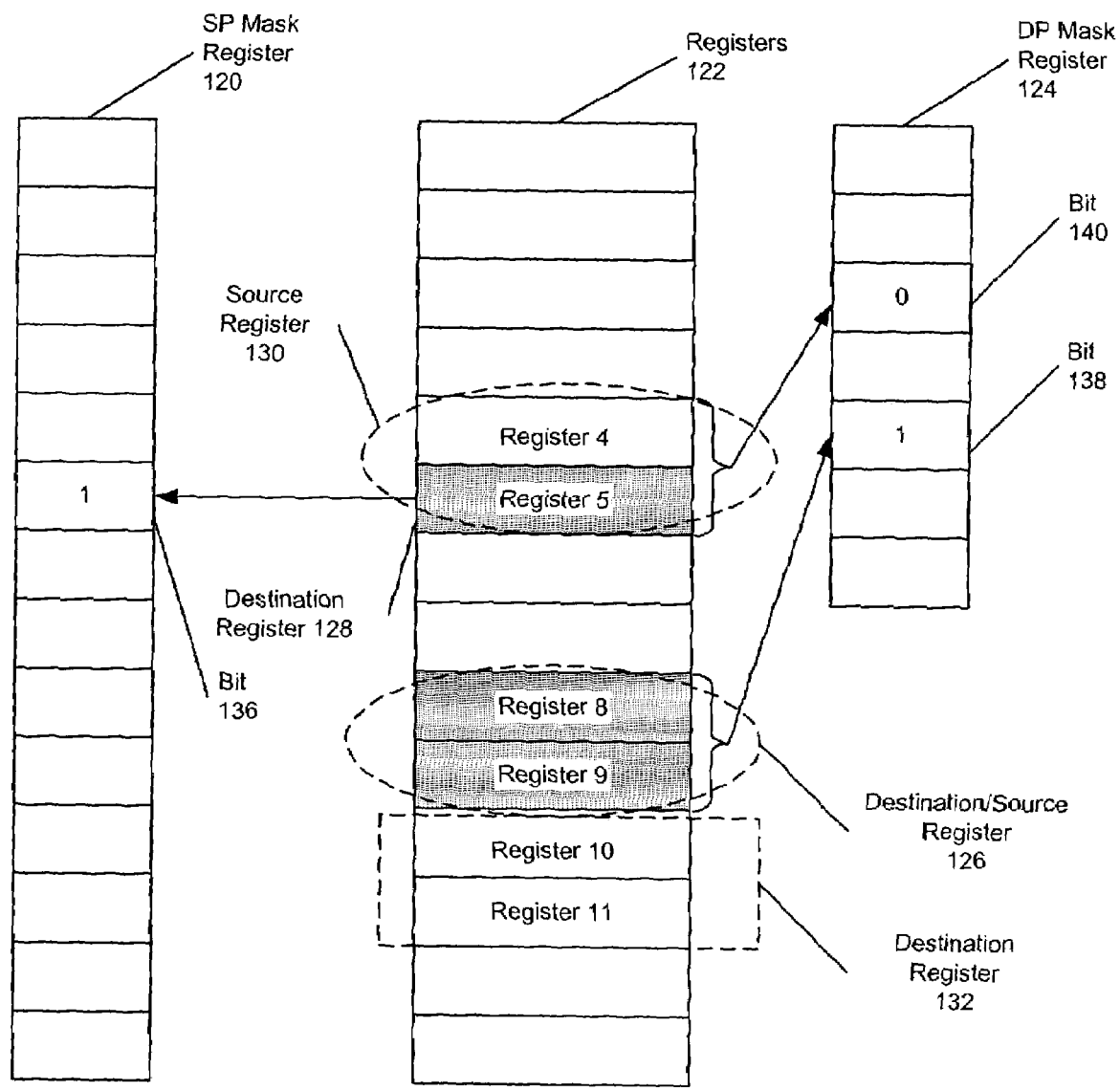
FIG. 12 shows a block diagram of a set of registers, a single precision mask register, and a double precision mask register in accordance with an embodiment of the invention.

In applying the invention to Code Sample 1, where each instruction in the sample comes in a different fetch group, the floating point operations in Code Sample 1 may be executed properly. FIG. 12 shows a block diagram of an exemplary set of registers, a SP mask register, and a DP mask register in accordance with an embodiment of the invention. The set of registers (122) include two source registers (126, 130) and three destination registers (126, 128, 132). Further, the SP mask (124) with a bit (136) and DP mask (124) with bits (138, 140) are shown.

Assuming that a SP counter and DP counter are zero, a floating point operation in line 1 of Code Sample 1, a double precision floating point instruction, is forwarded thereby incrementing the DP counter. The double precision floating point operation updates destination register (126), and thus the DP mask (120) is updated accordingly, resulting in bit (138) indexed with logic 1.

In line 2 of Code Sample 1, a single precision floating point operation is forwarded as indicated by the criteria because the counter boolean is "false" and the operand criteria and the mask criteria are "false." The single precision floating point operation increments the SP counter. Moreover, the single precision floating point operation updates destination register (128), and thus the SP mask (120) is updated accordingly, resulting in bit (136) indexed with logic 1.

The SP and DP counters are now non-zero, and neither floating point operations has committed. In this case, the criteria is applied to the floating point operation in line 3 of Code Sample 1. The source register (130) in the third floating point operation (the "younger" instruction) reference as a source operand the destination register (128), namely the floating point operation in line 2 of Code Sample 1. This can be seen by logic 1 in its corresponding position, i.e., indexing single precision mask register with source register (130) reveals logic 1 (i.e., bit (136)). Therefore, the criteria stalls the floating point operation, because the mask criteria is true. The floating point operation in line 3 of Code Sample 1 is stalled until the SP counter is zero. When the SP counter is zero, (i.e., the second floating point operation is committed in line 2 of Code Sample 1), then the third floating point operation may be forwarded to execute properly.

Advantages of the present invention may include one or more of the following. In one or more embodiments, the design effort and complexity of logic typically required in a rename and issue units to handle floating point instructions is minimized by a single precision mask register and counter, and a double precision mask register and counter in the decode unit. The cycle time in the rename and issue unit may be reduced by allowing the decode unit to stall on a mix of double precision and single precision floating point instructions in an instruction stream.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for handling a plurality of single precision floating point instructions and a plurality of double precision floating point instructions in a fetch group without conflict in registers, wherein the method utilizes a decode unit comprising:
a first counter arranged to increment for at least one of the plurality of single precision floating point instructions forwarded, without regard to double precision floating point instructions forwarded;
a second counter arranged to increment for at least one of the plurality of double precision floating point instructions forwarded, without regard to single precision floating point instructions forwarded;
a first mask register indexed by single precision registers, wherein the first mask register is updated by at least one of the plurality of single precision floating point instructions forwarded, without regard to double precision floating point instructions forwarded; and
a second mask register indexed by double precision registers, wherein the second mask register is updated by at least one of the plurality of double precision floating point instructions forwarded, without regard to single precision floating point instructions forwarded, wherein the method comprises:
decoding at least one of the plurality of the single precision floating point instructions and at least one of the plurality of the double precision floating point instructions;
evaluating the at least one of the plurality of the single precision floating point instructions and the at least one of the double precision floating point instructions in the fetch group, wherein the evaluating is based on values of the first counter and the second counter and based on a value of an entry in the first mask register and a value of an entry in the second mask register; and
based on the evaluating, processing the at least one of the plurality of the single precision floating point instructions and the at least one of the plurality of the double precision floating point instructions.

2. The method of claim 1, wherein the evaluating comprises:
determining values of the first counter and the second counter;
determining whether the at least one of the plurality of the single precision floating point instructions is younger than a double precision floating point instruction in the fetch group and whether a source register of the at least one of the plurality of the single precision floating point instructions references a destination register of the double precision floating point instruction; and
if the first and the second counters are non-zero, determining whether the value of the entry in the second mask register corresponding to the source register of the single precision floating point instruction is indexed with a particular logic value.

3. The method of claim 2, wherein the processing comprises:
forwarding the at least one of the plurality of the single precision floating point instructions;
incrementing the first counter; and
updating a value of an entry in the first mask register.

4. The method of claim 2, wherein the processing comprises:
committing the at least one of the plurality of the single precision floating point instructions; and
decrementing the first counter, and if the first counter reaches zero, clearing the first mask register.

5. The method of claim 2, wherein the processing comprises stalling the at least one of the plurality of the single precision floating point instructions.

6. The method of claim 1, wherein the evaluating comprises:
   determining values of the first counter and the second counter;
   determining whether the at least one of the plurality of the double precision floating point instructions is younger than a single precision floating point instruction in the fetch group and whether a source register of the at least one of the plurality of the double precision floating point instructions references a destination register of the single precision floating point instruction; and
   if the first and the second counters are non-zero, determining whether the value of the entry in the first mask register corresponding to the source register of the double precision floating point instruction is indexed with a particular logic value.

7. The method of claim 6, wherein the processing comprises:
   forwarding the at least one of the plurality of the double precision floating point instructions;
   incrementing the second counter; and
   updating a value of an entry in the second mask register.

8. The method of claim 6, wherein the processing comprises:
   committing the at least one of the plurality of the double precision floating point instructions; and
   decrementing the second counter, and if the second counter reaches zero, clearing the second mask register.

9. The method of claim 6, wherein the processing comprises stalling the at least one of the plurality of the double precision floating point instruction.

10. The method of claim 1, wherein the first mask comprises a thirty-two entry mask.

11. The method of claim 1, wherein the thirty-two entry mask corresponds to thirty-two single precision registers.

12. The method of claim 1, wherein the second mask comprises a sixteen entry mask.

13. The system of claim 1, wherein the sixteen entry mask corresponds to sixteen double precision registers.

14. A method for handling a plurality of single precision and a plurality of double precision floating point instructions without conflict in registers,
   wherein the method utilizes a decode unit comprising:
      a first counter arranged to increment for at least one of the plurality of single precision floating point instructions forwarded, without regard to double precision floating point instructions forwarded;
      a second counter arranged to increment for at least one of the plurality of double precision floating point instructions forwarded, without regard to single precision floating point instructions forwarded;
      a first mask register indexed by single precision registers, wherein the first mask register is updated by at least one of the plurality of single precision floating point instructions forwarded, without regard to double precision floating point instructions forwarded; and
      a second mask register indexed by double precision registers, wherein the second mask register is updated by at least one of the plurality of double precision floating point instructions forwarded, without regard to single precision floating point instructions fowarded,
   wherein the method comprises:
      step for decoding at least one of the plurality of single precision floating point instructions and at least one of the plurality of the double precision floating point instructions;
      step for evaluating the at least one of the plurality of the single precision floating point instructions and the at least one of the plurality of the double precision floating point instructions in the fetch group, wherein the step for evaluating is based on values of the first counter and the second counter and based on indexing of the first mask register and the second mask register; and
      based on the step for evaluating, step for processing the at least one of the plurality of the single precision floating point instructions and the at least one of the plurality double precision floating point instructions.

15. The method of claim 14, wherein the step for evaluating comprises:
   step for determining values of the first counter and the second counter;
   step for determining whether the at least one of the plurality of the single precision floating point instructions is younger than a double precision floating point instruction in the fetch group and whether a source register of the at least one of the plurality of the single precision floating point instructions references a destination register of the double precision floating point instruction; and
   if the first and the second counters are non-zero, step for determining whether the value of the entry in the second mask register corresponding to the source register of the single precision floating point instruction is indexed with a particular logic value.

16. The system of claim 15, wherein the step for processing comprises:
   step for forwarding the at least one of single precision floating point instructions;
   step for incrementing the first counter; and
   step for updating a value of an entry in the first mask register.

17. The system of claim 15, wherein the step for processing comprises:
   step for committing the at least one of the single precision floating point instructions; and
   step for decrementing the first counter, and if the first counter reaches zero, step for clearing the first mask register.

18. The system of claim 15, wherein the step for processing comprises step for stalling the at least one of the single precision floating point instructions.

19. The method of claim 14, wherein the step for evaluating comprises:
   step for determining values of the first counter and the second counter;
   step for determining whether the at least one of the plurality of the double precision floating point instructions is younger than a single precision floating point instruction in the fetch group and whether a source register of the at least one of the plurality of the double precision floating point instructions references a destination register of the single precision floating point instruction; and
   if the first and the second counters are non-zero, step for determining whether the value of the entry in the first mask register corresponding to the source register of the double precision floating point instruction is indexed with a particular logic value.

20. The system of claim 19, wherein the step for processing comprises:
   step for forwarding the at least one of the double precision floating point instructions;
   step for incrementing the second counter; and
   step for updating a value of an entry in the second mask register.

21. The system of claim 19, wherein the step for processing comprises:
   step for committing the at least one of the double precision floating point instructions; and
   step for decrementing the second counter, and if the second counter reaches zero, step for clearing the second mask register.

22. The method of claim 19, wherein the step for processing comprises a step for stalling the at least one of the double precision floating point instructions.

* * * * *

UNITED STATES PATENT AND TRADEMARK OFFICE
CERTIFICATE OF CORRECTION

| | |
|---|---|
| PATENT NO. | : 7,191,316 B2 |
| APPLICATION NO. | : 10/353662 |
| DATED | : March 13, 2007 |
| INVENTOR(S) | : Rabin A. Sugumar et al. |

Page 1 of 1

It is certified that error appears in the above-identified patent and that said Letters Patent is hereby corrected as shown below:

In Claim 13, column 11, line 39, the word "system" should be --method--.

In Claim 16, column 12, line 32, the word "system" should be --method--.

In Claim 17, column 12, line 39, the word "system" should be --method--.

In Claim 18, column 12, line 46, the word "system" should be --method--.

In Claim 20, column 13, line 1, the word "system" should be --method--.

In Claim 21, column 13, line 8, the word "system" should be --method--.

Signed and Sealed this

Sixteenth Day of March, 2010

David J. Kappos
*Director of the United States Patent and Trademark Office*